(12) United States Patent
Hwang

(10) Patent No.: US 11,627,649 B2
(45) Date of Patent: Apr. 11, 2023

(54) LED DRIVING DEVICE WITH HIGH POWER EFFICIENCY AND LIGHTING APPARATUS INCLUDING THE SAME

(71) Applicant: WELLANG CO., LTD., Gyeonggi-do (KR)

(72) Inventor: Jong Tae Hwang, Seoul (KR)

(73) Assignee: WELLANG CO., LTD., Gyeonggi-do (KR)

( * ) Notice: Subject to any disclaimer, the term of this patent is extended or adjusted under 35 U.S.C. 154(b) by 0 days.

(21) Appl. No.: 17/860,650

(22) Filed: Jul. 8, 2022

(65) Prior Publication Data

US 2023/0081551 A1 Mar. 16, 2023

(30) Foreign Application Priority Data

Sep. 13, 2021 (KR) .......................... 10-2021-0122075

(51) Int. Cl.
*H05B 45/48* (2020.01)

(52) U.S. Cl.
CPC .................... *H05B 45/48* (2020.01)

(58) Field of Classification Search
CPC ........ H05B 45/00; H05B 45/30; H05B 45/40; H05B 45/48; H05B 47/10
See application file for complete search history.

(56) References Cited

U.S. PATENT DOCUMENTS

| 10,880,966 | B2 * | 12/2020 | Eum | ............. | H05B 45/397 |
| 2016/0007420 | A1 * | 1/2016 | Gong | ............. | H05B 45/48 |
| | | | | | 315/193 |

FOREIGN PATENT DOCUMENTS

| JP | 2015115594 A | 6/2015 |
| KR | 1020150100400 A | 9/2015 |
| KR | 1020170082012 A | 7/2017 |
| KR | 1020180032698 A | 4/2018 |
| KR | 102296219 B1 | 9/2021 |

OTHER PUBLICATIONS

Office Action issued in corresponding Korean Application No. 10-2021-0122075 dated Jan. 14, 2022, and English Translation, 14 pages.
Notice of Allowance issued in corresponding Korean Application No. 10-2021-0122075 dated Mar. 24, 2022, and English Translation, 4 pages.
Office Action issued in corresponding JP Application No. 2022-109001, dated Aug. 8, 2022, 5 pages.

* cited by examiner

*Primary Examiner* — Jimmy T Vu
(74) *Attorney, Agent, or Firm* — Guntin & Gust, PLC; Miyoung Shin

(57) ABSTRACT

A light emitting diode (LED) driving device for driving an LED array including one or more LEDs includes a rectifier configured to provide a rectified voltage obtained from an alternating current (AC) voltage to the LED array, an LED driver configured to sequentially drain an LED driving current from the LED array via a plurality of first nodes, and a first switch circuit connected to the LED array via a plurality of second nodes. The first switch circuit includes a plurality of first switches commonly connected to a first common node which is one of the plurality of first nodes, and respectively connected to the plurality of second nodes, and a first controller configured to control the plurality of first switches to be sequentially turned on and sequentially turned off.

11 Claims, 15 Drawing Sheets

LED DRIVING DEVICE WITH HIGH POWER EFFICIENCY AND LIGHTING APPARATUS INCLUDING THE SAME

CROSS-REFERENCE TO RELATED APPLICATION

This application is based on and claims priority under 35 U.S.C. § 119 to Korean Patent Application No. 10-2021-0122075, filed on Sep. 13, 2021, in the Korean Intellectual Property Office, the disclosure of which is incorporated by reference herein in its entirety.

BACKGROUND

1. Field

One or more embodiments relate to a light emitting diode (LED), and more particularly, to an LED driving device having high power efficiency and a lighting apparatus including the same.

2. Description of the Related Art

A light-emitting diode (LED), as an example of light-emitting devices, is used in various applications due to its low power consumption and small size. The intensity of light emitted from an LED may depend on the magnitude of a current passing therethrough, and a lighting apparatus powered by an alternating current (AC) voltage may include a component for providing an appropriate current to LEDs based on the AC voltage. Therefore, efficiently providing a current to LEDs from an AC power source is required. A lighting apparatus may be required to stably emit light irrespective of the magnitude of an AC voltage fluctuating with the environment.

SUMMARY

One or more embodiments include a light emitting diode (LED) driving device with high power efficiency in various environments, and a lighting apparatus including the same.

Additional aspects will be set forth in part in the description which follows and, in part, will be apparent from the description, or may be learned by practice of the presented embodiments of the disclosure.

According to one or more embodiments, an LED driving device for driving an LED array including one or more LEDs includes a rectifier configured to provide a rectified voltage obtained from an alternating current (AC) voltage to the LED array, an LED driver configured to sequentially drain an LED driving current from the LED array via a plurality of first nodes, and a first switch circuit connected to the LED array via a plurality of second nodes. The first switch circuit includes a plurality of first switches respectively connected to the plurality of second nodes, and a first controller configured to control the plurality of first switches to be turned on and turned off while the LED driver is draining the LED driving current via a first common node which is one of the plurality of first nodes. When each of the plurality of first switches is turned on, the each of the plurality of first switches allows the LED driving current to flow to the first common node from a second node which is one of the plurality of second nodes and connected to the each of the plurality of first switches.

The LED driver may be configured to drain a maximum amplitude of the LED driving current via the first common node.

When a peak of the AC voltage is less than a reference value, at least one of the plurality of first switches may be always turned off.

The plurality of first switches may include a first transistor connected to the first common node and one of the plurality of second nodes, and a second transistor connected to the first common node and another of the plurality of second nodes. When the second transistor is turned on, the LED driving current may pass through at least one LED between second nodes to which the first transistor and the second transistor are respectively connected from among the one or more LEDs. The first controller may be configured to provide a first control voltage to the first transistor and provide a second control voltage greater than the first control voltage to the second transistor.

Each of the first control voltage and the second control voltage may be a direct current voltage.

The first controller may include a first amplifier configured to generate the first control voltage, based on a first reference voltage, and a second amplifier configured to generate the second control voltage, based on a second reference voltage.

The first controller may include a resistor connected to the LED array, and at least one diode connected to the resistor in series, and the first control voltage may be a voltage dropped from the second control voltage by the at least one diode.

The LED driver may be included in a semiconductor package, and the first switch circuit may be mounted on a printed circuit board (PCB) together with the semiconductor package.

The LED driving device may further include a second switch circuit connected to the LED array via a plurality of third nodes. The second switch circuit may include a plurality of second switches commonly connected to a second common node which is one of the plurality of first nodes, and respectively connected to the plurality of third nodes, and a second controller configured to control the plurality of second switches to be sequentially turned on and sequentially turned off.

BRIEF DESCRIPTION OF THE DRAWINGS

The above and other aspects, features, and advantages of certain embodiments of the inventive concept will be more apparent from the following description taken in conjunction with the accompanying drawings, in which:

FIG. 7B is yet another example of a circuit diagram of a switch circuit according to one or more embodiments;

DETAILED DESCRIPTION

Figure 1:
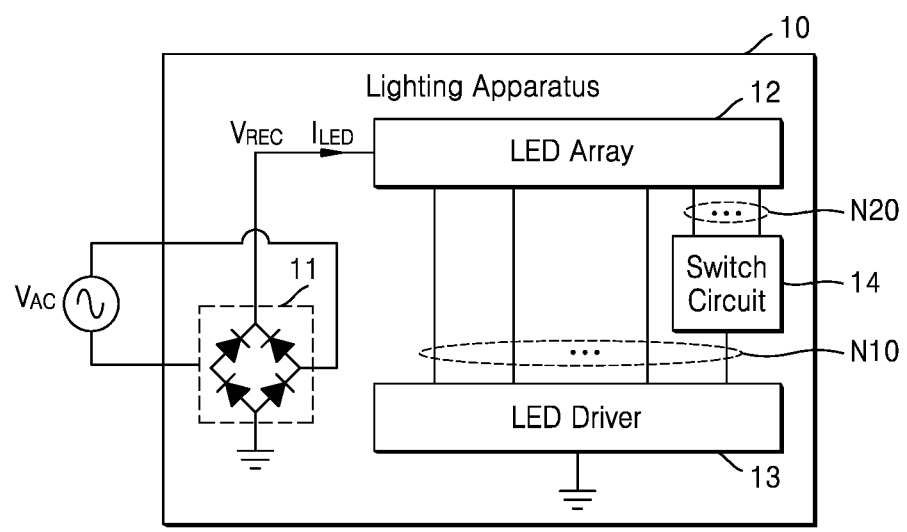
FIG. 1 is a block diagram of a lighting apparatus according to one or more embodiments.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "one or more of," when preceding a list of elements, modify the entire list of elements and do not modify the individual elements of the list.

Hereinafter, the present disclosure will be described more fully with reference to the accompanying drawings, in which exemplary embodiments of the present disclosure are shown. These embodiments are provided so that this disclosure will be thorough and complete, and will fully convey the scope of the present disclosure to one of ordinary skill in the art. As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the drawings, like reference numerals denote like elements and the sizes or thicknesses of elements may be exaggerated for clarity of explanation.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including", "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined differently, all terms used in the description including technical and scientific terms have the same meaning as generally understood by one of ordinary skill in the art to which this invention belongs. It will be further understood that terms, such as those defined in commonly used dictionaries, should be interpreted as having a meaning that is equal to their meaning in the context of the relevant art and will not be interpreted in an idealized or overly formal sense unless expressly so defined herein.

FIG. 1 is a block diagram of a lighting apparatus 10 according to one or more embodiments. In detail, FIG. 1 is a block diagram showing an alternating current (AC) voltage source providing power to the lighting apparatus 10, together with the lighting apparatus 10. The lighting apparatus 10 may emit light, based on power provided from an AC voltage $V_{AC}$. According to some embodiments, the lighting apparatus 10 may be included in a lamp for indoor lighting, outdoor lighting, portable lighting, and vehicle lighting, as non-limiting examples. According to some embodiments, the lighting apparatus 10 may be an independently distributed unit, and may have a structure removable from a lamp.

Referring to FIG. 1, the lighting apparatus 10 may include a rectifier 11, a light-emitting diode (LED) array 12, an LED driver 13, and a switch circuit 14. According to some embodiments, two or more components included in the lighting apparatus 10 may be included in one semiconductor package. For example, the rectifier 11, the LED driver 13, and the switch circuit 14 may be included in at least one semiconductor package. According to some embodiments, the lighting apparatus 10 may include a printed circuit board (PCB), and at least one semiconductor package may be mounted on the PCB.

The rectifier 11 may rectify the AC voltage $V_{AC}$ to generate a rectified voltage $V_{REC}$. For example, the rectifier 11 may full-wave rectify the AC voltage $V_{AC}$ and may provide the rectified voltage $V_{REC}$ to the LED array 12. Herein, it is assumed that the rectifier 11 is a full-wave rectifier, but one or more embodiments are not limited thereto.

The LED array 12 may include at least one LED. For example, the LED array 12 may include a single LED or at least one LED string including two or more LEDs connected in series. The LED array 12 may include a plurality of LEDs having substantially the same color temperature in some embodiments or may include a plurality of LEDs each having two or more different color temperatures in some other embodiments. LED strings included in the LED array 12 may each receive at least a portion of an LED driving current $I_{LED}$, and may emit light with an intensity determined according to the magnitude of a current passing therethrough.

The LED driver 13 may drain the LED driving current $I_{LED}$ from the LED array 12. For example, as shown in FIG. 1, the LED driver 13 may drain the LED driving current $I_{LED}$ via a plurality of first nodes N10, and thus the LED driving current $I_{LED}$ may flow from the rectifier 11 to the LED array 12. As will be described later with reference to FIG. 3A and others, the LED driver 13 may sequentially drain the LED driving current $I_{LED}$ from the LED array 12 via the plurality of first nodes N10, and the LED driving current $I_{LED}$ may have a magnitude that tracks the rectified voltage $V_{REC}$.

The switch circuit 14 may be connected between the LED array 12 and the LED driver 13. For example, as shown in FIG. 1, the switch circuit 14 may be connected to the LED driver 13 via one (herein, referred to as a first common node) of the plurality of first nodes N10, and may be connected to the LED array 12 via a plurality of second nodes N20. As will be described later with reference to FIG. 4 and others, the LED driving current LED output via a first node connected to the LED driver 13 (i.e., the first common node) may be drained by the switch circuit 14 from the LED array 12 via at least one of the plurality of second nodes N20. Accordingly, the lighting apparatus 10 may not only have high power efficiency as will be described later with reference to FIG. 5A, but also may maintain high power efficiency even when the peak of the AC voltage $V_{AC}$ fluctuates as described below with reference to FIG. 5B.

According to some embodiments, the switch circuit 14 may be implemented independently of the LED driver 13. For example, the LED driver 13 may be included in a semiconductor package, and the switch circuit 14 may be implemented as a separate semiconductor package or two or more semiconductor packages and mounted on the PCB together with the semiconductor package of the LED driver 13. Therefore, the switch circuit 14 may be easily added to or removed from the lighting apparatus 10 including the LED array 12 and the LED driver 13, and the switch circuit 14 may be selectively included according to various requirements of the lighting apparatus 10 (e.g., power efficiency, costs, and volume). As a result, the production of various types of lighting apparatuses may be facilitated. Herein, components for driving the LED array 12, namely, the rectifier 11, the LED driver 13, and the switch circuit 14, may be collectively referred to as an LED driving device.

Figure 2:
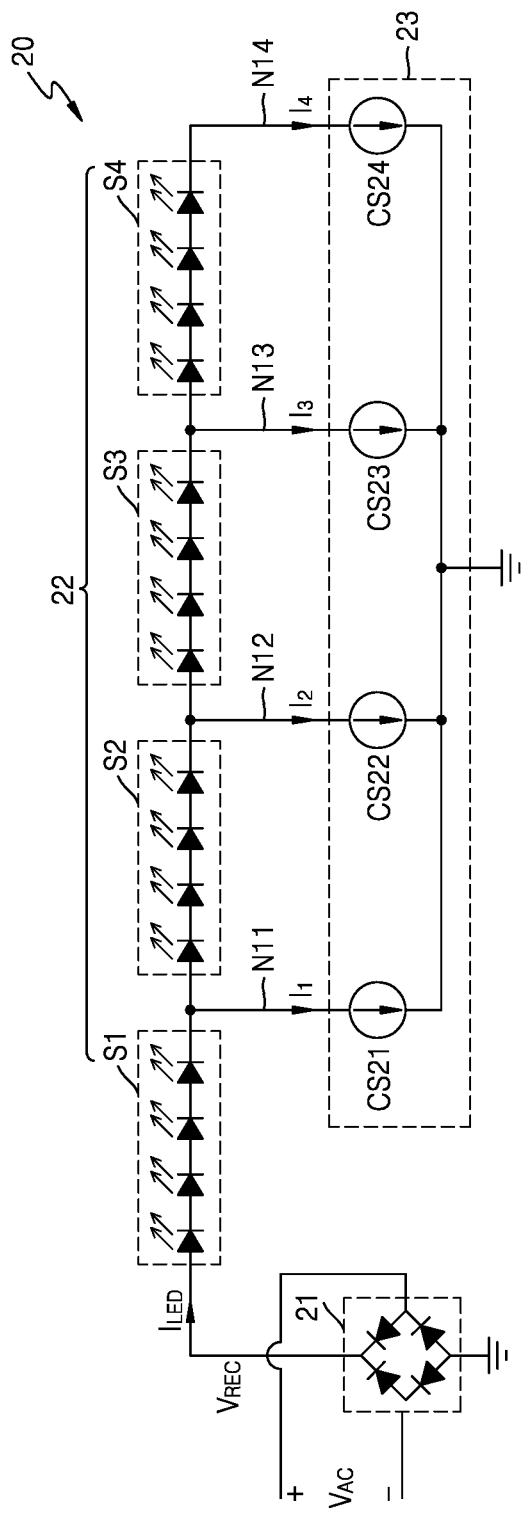
FIG. 2 is a circuit diagram of a lighting apparatus according to one or more embodiments.
Figure 3A:
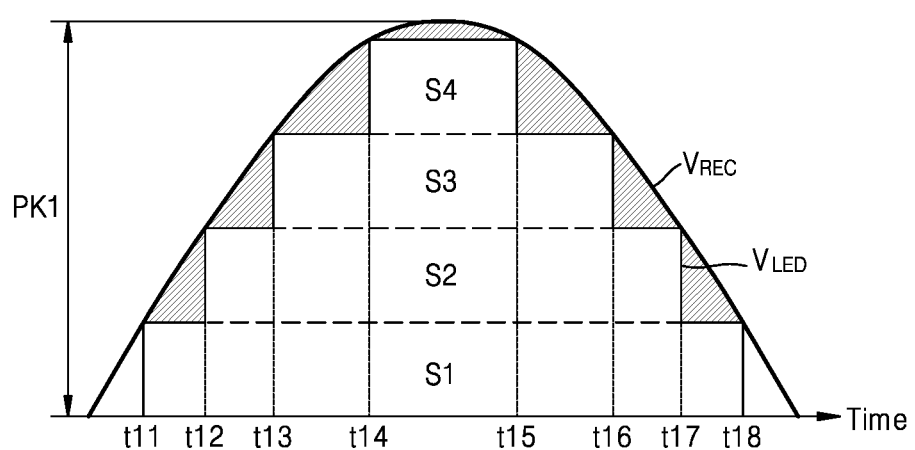
FIGS. 3A and 3B are timing diagrams of operations of a lighting apparatus according to one or more embodiments.
Figure 3B:
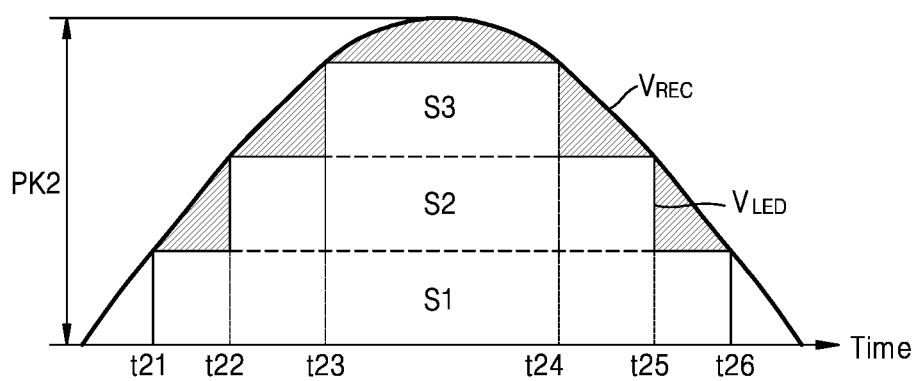

FIG. 2 is a circuit diagram of a lighting apparatus 20 according to one or more embodiments, and FIGS. 3A and 3B are timing diagrams showing examples of an operation of the lighting apparatus 20 according to one or more embodiments. In detail, the circuit diagram of FIG. 2 shows the lighting apparatus 20 in which the switch circuit 14 of FIG. 1 is omitted.

Referring to FIG. 2, the lighting apparatus 20 may include a rectifier 21, an LED array 22, and an LED driver 23. The rectifier 21 may generate a rectified voltage $V_{REC}$ from an AC voltage $V_{AC}$. The LED array 22 may receive the rectified voltage $V_{REC}$, and include first through fourth LED strings S1 through S4 serially connected to one another.

The LED driver 23 may be connected to the LED array 22 through four first nodes N11 through N14 respectively corresponding to the first through fourth LED strings S1 through S4, and may drain the LED driving current $I_{LED}$. To this end, the LED driver 23 may include first through fourth current sources CS21 through CS24 respectively connected to the four first nodes N11 through N14, and the first through fourth current sources CS21 through CS24 may generate the first to fourth LED driving currents in an enable state, respectively. According to some embodiments, as will be described below, the first through fourth currents $I_1$ through $I_4$ may sequentially increase or have the same magnitude ($I_1 \leq I_2 \leq I_3 \leq I_4$).

The first through fourth current sources CS21 through CS24 may be mutually exclusively enabled according to voltages of the four first nodes N11 through N14, respectively. For example, as the rectified voltage $V_{REC}$ increases, the first through fourth current sources CS21 through CS24 may be sequentially enabled, and, when another current source is enabled, a previously enabled current source may be disabled. According to some embodiments, the LED driver 23 may include a control circuit for controlling the first through fourth current sources CS21 through CS24 as described above.

Hereinafter, an LED array including four LED strings and an LED driver draining the LED driving current $I_{LED}$ from the LED array through four first nodes will be mainly described, but one or more embodiments are not limited thereto. For example, the LED array 22 may include a number of LED strings different from that shown in FIG. 2, and the LED driver 23 may be connected to the LED array 22 via a number of nodes corresponding to the number of LED strings. According to some embodiments, an LED string may include a number of LEDs different from that shown in FIG. 2, the LEDs being serially connected to one another. According to some embodiments, one LED shown in FIG. 2 may include two or more LEDs connected to each other in parallel. In FIGS. 3A and 3B, a LED voltage VIED may correspond to a voltage across LEDs through which the LED driving current $I_{LED}$ passes.

Referring to FIG. 3A, a rectified voltage $V_{REC}$ having a first peak PK1 may be provided to the LED array 22, and the first peak PK1 may be greater than a second peak PK2 of FIG. 3B, which will be described later, (PK1>PK2). In a period from a time point t11 to a time point t12 and a period from a time point t17 to a time point t18, only the first current source CS21 may be enabled and the LED driving current $I_{LED}$ may be equal to the first current $I_1$, and thus, as shown in FIG. 3A, the first LED string S1 may emit light. In a period from the time point t12 to a time point t13 and a period from a time point t16 to the time point t17, only the second current source CS22 may be enabled and the LED driving current $I_{LED}$ may be equal to the second current $I_2$, and thus, as shown in FIG. 3A, the first LED string S1 and the second LED string S2 may emit light. In a period from the time point t13 to a time point t14 and a period from a time point t15 to the time point t16, only the third current source CS23 may be enabled and the LED driving current $I_{LED}$ may be equal to the third current $I_3$, and thus, as shown in FIG. 3A, the first through third LED strings S1 through S3 may emit light. In a period from the time point t14 to the time point t14, only the fourth current source CS24 may be enabled and the LED driving current $I_{LED}$ may be equal to the fourth current $I_4$, and thus, as shown in FIG. 3A, the first through fourth LED strings S1 through S4 may emit light.

In FIG. 3A, hatched regions between the rectified voltage $V_{REC}$ and the LED voltage $V_{LED}$ may correspond to power loss, and, as the area of the hatched regions decreases, power efficiency may increase. As shown in FIG. 3A, in periods where an absolute slope of the rectified voltage $V_{REC}$ is relatively low, namely, the period from the time point t13 to the time point t14 and the period from the time point t15 to the time point t16, relatively large power loss may occur. Hereinafter, as will be described later with reference to FIGS. 4 and 5A, the switch circuit 14 of FIG. 1 may reduce power loss occurring in the period from the time point t13 to the time point t14 and the period from the time point t15 to the time point t16, and thus may enable high power efficiency.

Referring to FIG. 3B, a rectified voltage $V_{REC}$ having the second peak PK2, which is less than the first peak PK1 of FIG. 3A, may be provided to the LED array 22 (PK2<PK1). The magnitude (for example, a peak) of the AC voltage $V_{AC}$ provided to the lighting apparatus 20 may fluctuate due to various factors, and thus the magnitude of the rectified voltage $V_{REC}$ provided to the LED array 22 may also fluctuate. In a period from a time point t21 to a time point t22 and a period from a time point t25 to a time point t26, only the first current source CS21 may be enabled and the LED driving current $I_{LED}$ may be equal to the first current $I_1$, and thus, as shown in FIG. 3B, the first LED string S1 may emit light. In a period from the time point t22 to a time point t23 and a period from a time point t24 to the time point t25, only the second current source CS22 may be enabled and the LED driving current $I_{LED}$ may be equal to the second current $I_2$, and thus, as shown in FIG. 3B, the first LED string S1 and the second LED string S2 may emit light. In a period from the time point t23 to the time point t24, only the third current source CS23 may be enabled and the LED driving current $I_{LED}$ may be equal to the third current $I_3$, and thus, as shown in FIG. 3B, the first through third LED strings S1 through S3 may emit light.

In FIG. 3B, hatched regions between the rectified voltage $V_{REC}$ and the LED Voltage $V_{LED}$ may correspond to power loss, and, as the area of the hatched regions decreases, power efficiency may increase. Differently from the example of FIG. 3A, in FIG. 3B, the fourth current source CS24 may not be enabled, and thus the fourth LED string S4 may not emit light. As shown in FIG. 3B, power loss may increase in the period from the time point t23 to the time point t24, and thus power efficiency is lower than that of the example of FIG. 3A may be generated. Hereinafter, as will be described later with reference to FIGS. 4 and 5B, the switch circuit 14 of FIG. 1 may reduce power loss occurring in the period from the time point t23 to the time point t24, and thus may enable high power efficiency even when the magnitude of the rectified voltage $V_{REC}$ decreases.

Figure 4:
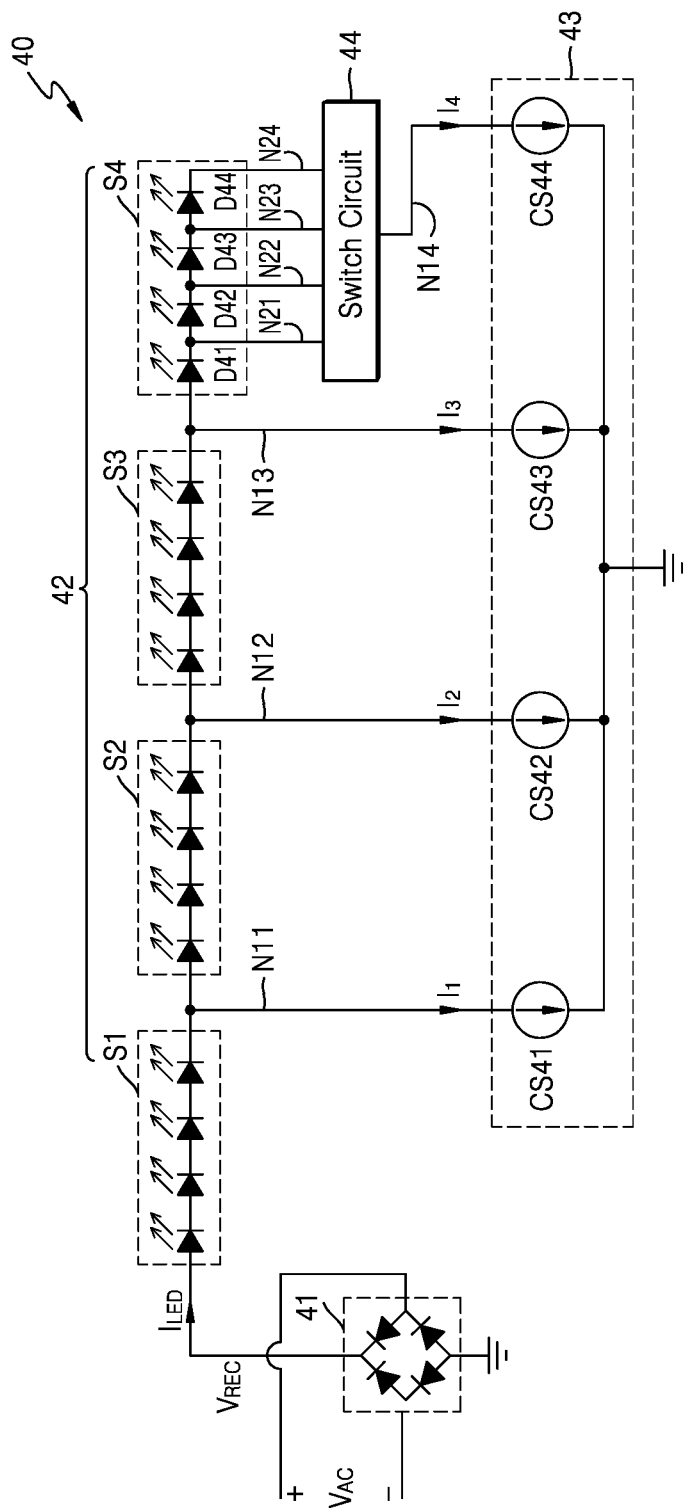
FIG. 4 is a circuit diagram of a lighting apparatus according to one or more embodiments.
Figure 5A:
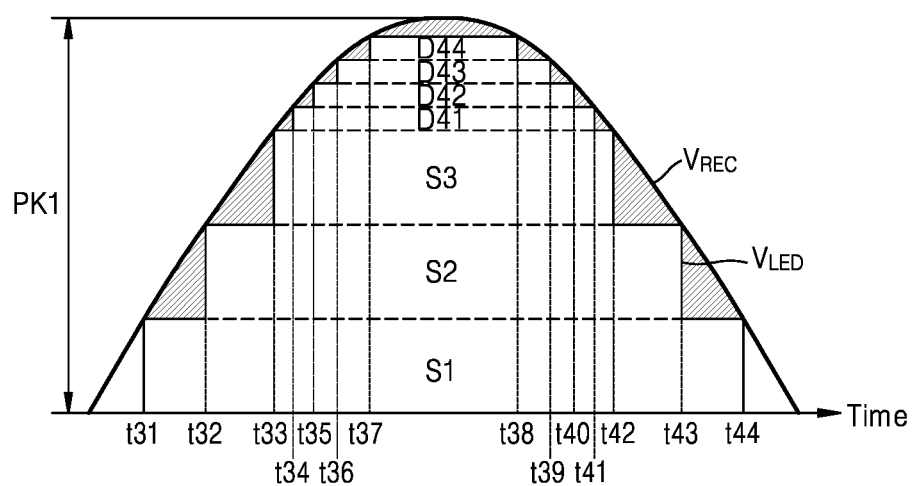
FIGS. 5A and 5B are timing diagrams of operations of a lighting apparatus according to one or more embodiments.
Figure 5B:
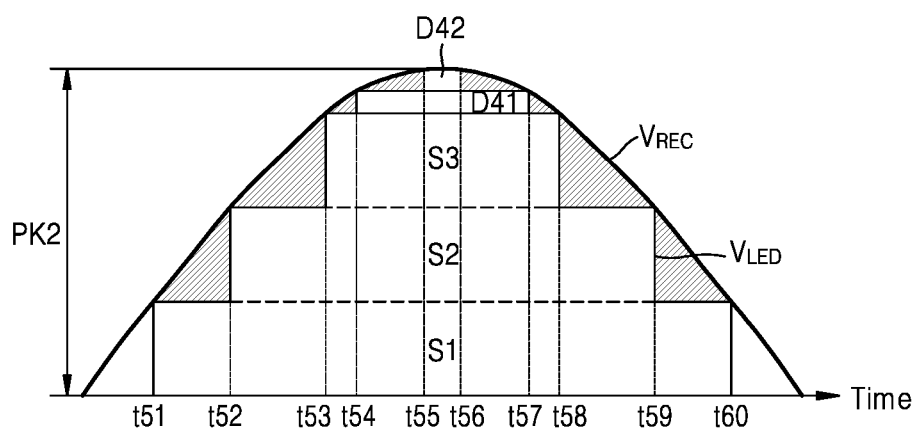

FIG. 4 is a circuit diagram of a lighting apparatus 40 according to one or more embodiments, and FIGS. 5A and 5B are timing diagrams showing examples of an operation of the lighting apparatus 40 according to one or more embodiments. In detail, the circuit diagram of FIG. 4 shows the lighting apparatus 40 including a switch circuit 44. A description of FIGS. 4, 5A, and 5B that is the same as given above with reference to FIGS. 2, 3A, and 3B will not be repeated herein.

Referring to FIG. 4, the lighting apparatus 40 may include a rectifier 41, a light-emitting diode (LED) array 42, an LED driver 43, and the switch circuit 44. The switch circuit 44 may be connected to the first node N14 (i.e., a first common node) from among the four first nodes N11 through N14, and may be connected to the LED array 42 via the four second nodes N21 through N24. For example, as shown in FIG. 4, the switch circuit 44 may be connected to the fourth LED string S4 from among the first through fourth LED strings S1 through S4, via the four second nodes N21 through N24. The LED driving current $I_{LED}$ passes through the fourth LED string S4 the latest and the fourth LED string S4 may include first through fourth LEDs D41 through D44 serially connected to one another. As described above with reference to FIG. 2, according to some embodiments, the fourth LED string S4 may include a number of LEDs different from that shown in FIG. 4, the LEDs being serially connected to one another, and the switch circuit 44 may be connected to the fourth LED string S4 via a different number of second nodes from that shown in FIG. 4. In FIGS. 5A and 5B, a LED voltage VIED may correspond to a voltage across LEDs through which the LED driving current $I_{LED}$ passes.

Referring to FIG. 5A, a rectified voltage $V_{REC}$ having a first peak PK1 may be provided to the LED array 42. In a period from a time point t31 to a time point t32 and a period from a time point t43 to a time point t44, only a first current source CS41 may be enabled and the LED driving current $I_{LED}$ may be equal to the first current $I_1$, and thus, as shown in FIG. 5A, the first LED string S1 may emit light. In a period from the time point t32 to a time point t33 and a period from a time point t42 to the time point t43, only a second current source CS42 may be enabled and the LED driving current $I_{LED}$ may be equal to the second current $I_2$, and thus, as shown in FIG. 5A, the first LED string S1 and the second LED string S2 may emit light. In a period from the time point t33 to a time point t34 and a period from a time point t41 to the time point t42, only a third current source CS43 may be enabled and the LED driving current $I_{LED}$ may be equal to the third current $I_3$, and thus, as shown in FIG. 5A, the first through third LED strings S1 through S3 may emit light.

In a period from the time point t34 to the time point t41, only a fourth current source CS44 may be enabled, and the LED driving current $I_{LED}$ may be equal to the fourth current $I_4$. In detail, in a period from the time point t34 to a time point t35 and a period from a time point t40 to the time point t41, the switch circuit 44 may allow the LED driving current $I_{LED}$ (i.e., the fourth current $I_4$) to flow via the second node N21 to which a cathode of the first LED D41 is connected from among the four second nodes N21 through N24. Thus, as shown in FIG. 5A, the first through third LED strings S1 through S3 and the first LED D41 may emit light. In a period from the time point t35 to a time point t36 and a period from a time point t39 to the time point t40, the switch circuit 44 may allow the LED driving current $I_{LED}$ to flow via the second node N22 to which a cathode of the second LED D42 is connected from among the four second nodes N21 through N24. Thus, as shown in FIG. 5A, the first through third LED strings S1 through S3, the first LED D41, and the second LED D42 may emit light. In a period from the time point t36 to a time point t37 and a period from a time point t38 to the time point t39, the switch circuit 44 may allow the LED driving current $I_{LED}$ to flow via the second node N23 to which a cathode of the third LED D43 is connected from among the four second nodes N21 through N24. Thus, as shown in FIG. 5A, the first through third LED strings S1 through S3 and the first through third LEDs D41 through D43 may emit light. In a period from the time point t37 to the time point t38, the switch circuit 44 may allow the LED driving current $I_{LED}$ to flow via the second node N24 to which a cathode of the fourth LED D44 is connected from among the four second nodes N21 through N24. Thus, as shown in FIG. 5A, the first through third LED strings S1 through S3 and the first through fourth LEDs D41 through D44 (i.e., the LED string S4, may emit light.

In FIG. 5A, hatched regions between the rectified voltage $V_{REC}$ and the LED voltage $V_{LED}$ may correspond to power loss, and, as the area of the hatched regions decreases, power efficiency may increase. Compared with a period in which the third LED string S3 emits light (i.e., the period from the time point t13 to the time point t16) in FIG. 3A, in a period in which the third LED string S3 emits light (i.e., the period from the time point t33 to the time point t42), power loss may significantly decrease, and thus power efficiency may increase.

Referring to FIG. 5B, a rectified voltage $V_{REC}$ having a second peak PK2 may be provided to the LED array 42. In a period from a time point t51 to a time point t52 and a period from a time point t59 to a time point t60, only the first current source CS41 may be enabled and the LED driving current $I_{LED}$ may be equal to the first current $I_1$, and thus, as shown in FIG. 5B, the first LED string S1 may emit light. In a period from the time point t52 to a time point t53 and a period from a time point t58 to the time point t59, only the second current source CS42 may be enabled and the LED driving current $I_{LED}$ may be equal to the second current $I_2$, and thus, as shown in FIG. 5B, the first LED string S1 and the second LED string S2 may emit light. In a period from the time point t53 to a time point t54 and a period from a time point t57 to the time point t58, only the third current source CS43 may be enabled and the LED driving current $I_{LED}$ may be equal to the third current $I_3$, and thus, as shown in FIG. 5B, the first through third LED strings S1 through S3 may emit light.

In a period from the time point t54 to the time point t57, only the fourth current source CS44 may be enabled, and the LED driving current $I_{LED}$ may be equal to the fourth current $I_4$. In detail, in a period from the time point t54 to a time point t55 and a period from a time point t56 to the time point t57, the switch circuit 44 may allow the LED driving current $I_{LED}$ (i.e., the fourth current $I_4$) to flow via the second node N21 to which the cathode of the first LED D41 is connected from among the four second nodes N21 through N24. Thus, as shown in FIG. 5B, the first through third LED strings S1 through S3 and the first LED D41 may emit light. In a period from the time point t55 to the time point t56, the switch circuit 44 may allow the LED driving current $I_{LED}$ to flow via the second node N22 to which the cathode of the second LED D42 is connected from among the four second nodes N21 through N24. Thus, as shown in FIG. 5B, the first through third LED strings S1 through S3, the first LED D41, and the second LED D42 may emit light.

In FIG. 5B, hatched regions between the rectified voltage $V_{REC}$ and the LED voltage $V_{LED}$ may correspond to power loss, and, as the area of the hatched regions decreases, power efficiency may increase. Compared with a period in which the third LED string S3 emits light (i.e., the period from the time point t23 to the time point t24) in FIG. 3B, in a period in which the third LED string S3 emits light (i.e., the period from the time point t53 to the time point t58), power loss may significantly decrease, and thus power efficiency may be maintained or increase despite a rectified voltage $V_{REC}$ having an attenuated magnitude.

Figure 6:
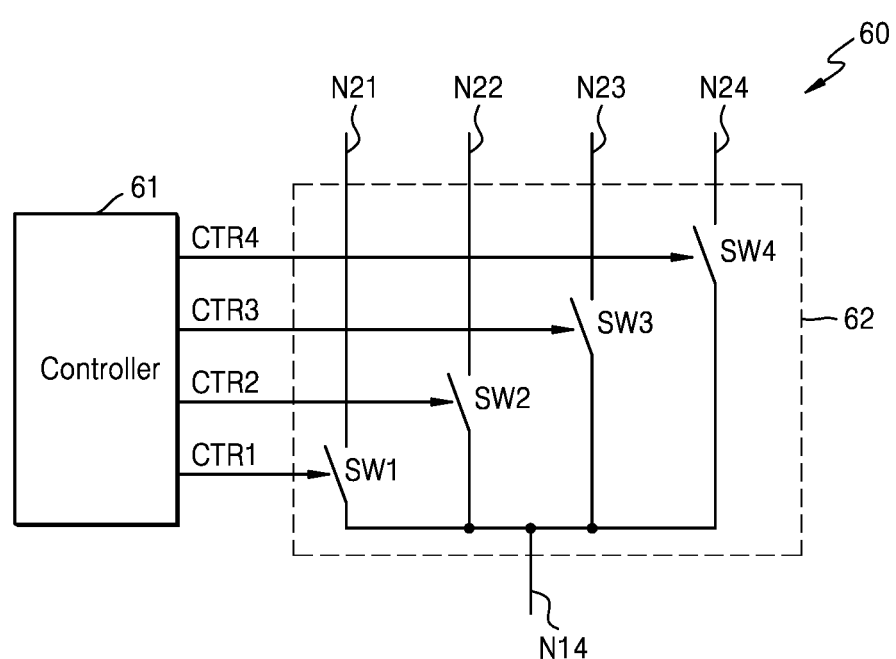
FIG. 6 is a block diagram of a switch circuit according to one or more embodiments.

FIG. 6 is a block diagram of a switch circuit 60 according to one or more embodiments. In detail, the block diagram of FIG. 6 illustrates the switch circuit 44 of FIG. 4. As shown in FIG. 6, the switch circuit 60 may include a controller 61 and a plurality of switches 62. FIG. 6 will now be described with reference to FIG. 4.

The plurality of switches 62 may be commonly connected to a single first node and may also be connected to a plurality of second nodes, respectively. For example, as shown in FIG. 6, the plurality of switches 62 may include first through fourth switches SW1 through SW4 connected to the first node N14 and respectively connected to the four second nodes N21 through N24. Each of the first through fourth switches SW1 through SW4 may electrically connect both ends in an on (or turned-on) state, and may electrically disconnect both ends in an off (or turned-off) state. According to some embodiments, as will be described later with reference to FIGS. 7A through 7E, each of the first through fourth switches SW1 through SW4 may include at least one transistor. As described above with reference to FIG. 5B, when the peak of the rectified voltage $V_{REC}$ (or the AC voltage $V_{AC}$) is less than a reference value, at least one switch including the fourth switch SW4 from among the first through fourth switches SW1 through SW4 may be always turned off.

The controller 61 may generate a plurality of control signals for controlling the plurality of switches 62. As described above with reference to FIGS. 5A and 5B, in a period where the fourth current source CS44 connected to the first node N14 is enabled, the LED driving current $I_{LED}$ (i.e., the fourth current $I_4$) may sequentially flow via the four second nodes N21 through N24 according to the magnitude of the rectified voltage $V_{REC}$. To this end, the controller 61 may generate first through fourth control signals CTR1 through CTR4 so that the first through fourth switches SW1 through SW4 are turned on and off at appropriate timings. According to some embodiments, differently from FIG. 6, the first through fourth switches SW1 through SW4 may be cascaded, and the controller 61 may generate a single control signal, as will be described with reference to FIGS. 7D and 7E. Illustrations of the controller 61 will be described later with reference to FIGS. 7A through 7E.

FIGS. 7A through 7E are circuit diagrams of switch circuits according to one or more embodiments. In detail, the circuit diagrams of FIGS. 7A through 7E illustrate examples of the switch circuit 44 of FIG. 4. FIGS. 7A through 7E will now be described with reference to FIG. 4, and a description of FIGS. 7A through 7E that is the same as given above with reference to FIG. 4 will not be repeated herein.

Figure 7A:
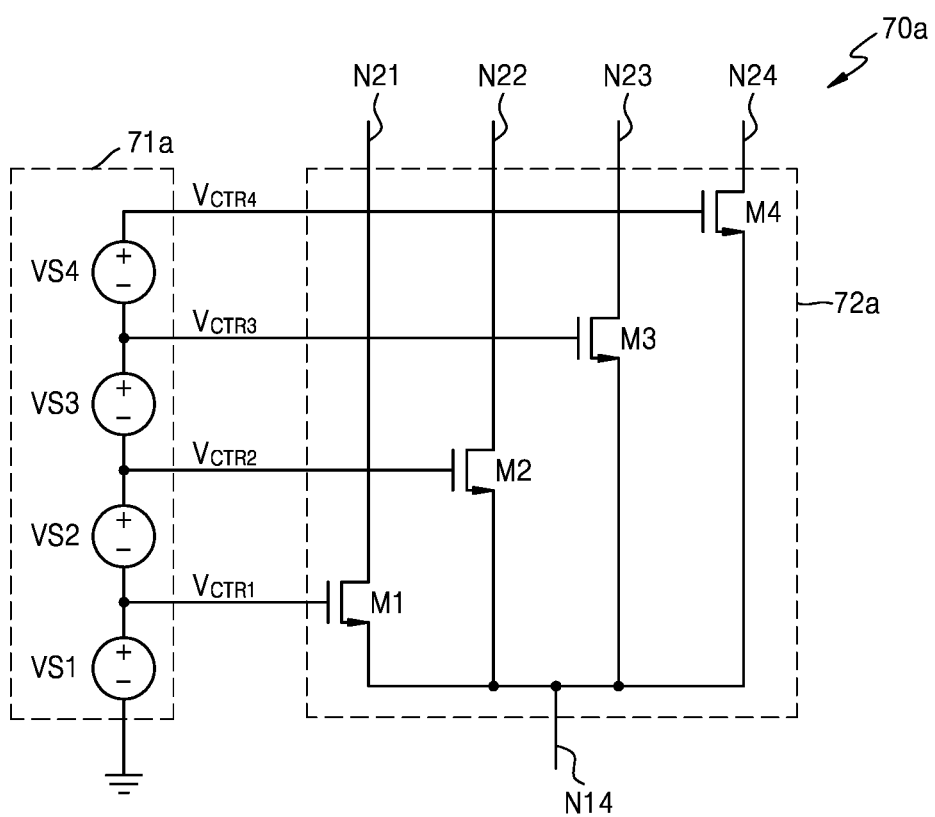
FIG. 7A is an example of a circuit diagram of a switch circuit according to one or more embodiments.

Referring to FIG. 7A, a switch circuit 70a may include a controller 71a and a plurality of switches 72a. The plurality of switches 72a may include first through fourth transistors M1 through M4 commonly connected to the first node N14 and respectively connected to the four second nodes N21 through N24. Although the first through fourth transistors M1 through M4 are n-channel field effect transistors (NFETs) in FIG. 7A, one or more embodiments are not limited thereto, and the plurality of switches 72a may include any type of transistors. For example, the plurality of switches 72a may include bipolar junction transistors. According to some embodiments, the first through fourth transistors M1 through M4 may have the same structures. According to some embodiments, the first through fourth transistors M1 through M4 may have different structures. For example, the first transistor M1 may have a smaller size than the second through fourth transistors M2 through M4.

The controller 71a may include first through fourth voltage sources VS1 through VS4, and may generate first through fourth control voltages $V_{CTR1}$ through $V_{CTR4}$ respectively corresponding to the first through fourth control signals CTR1 through CTR4 of FIG. 6. Each of the first through fourth voltage sources VS1 through VS4 may have an arbitrary structure that generates a positive DC voltage. Thus, the first through fourth control voltages $V_{CTR1}$ through $V_{CTR4}$ may sequentially increase ($V_{CTR1}<V_{CTR2}<V_{CTR3}<V_{CTR4}$), and may be provided to control electrodes (or gates) of the first through fourth transistors M1 through M4, respectively.

When Equation 1 below is satisfied, the first transistor M1 may be turned on, and the LED driving current $I_{LED}$ may flow through the first transistor M1.

$$V_{N13} > V_{D41} + V_{CTR1} - V_{TH} \quad \text{[Equation 1]}$$

In Equation 1, $V_{N13}$ indicates a voltage of the first node N13 of FIG. 4, $V_{D41}$ indicates a forward voltage of the first LED D41, and $V_{TH}$ indicates a threshold voltage of the first transistor M1.

When Equation 2 below is satisfied as the rectified voltage $V_{REC}$ increases, the second transistor M2 may be turned on, and the LED driving current $I_{LED}$ may flow through the second transistor M2.

$$V_{N13} > V_{D41} + V_{D42} + V_{CTR2} - V_{TH} \quad \text{[Equation 2]}$$

In Equation 1, $V_{D42}$ indicates a forward voltage of the second LED D42. In this case, the first transistor M1 may be also turned on. However, a gate-source voltage $V_{GS1}$ of the first transistor M1 may be less than a gate-source voltage $V_{GS2}$ of the second transistor M2 ($V_{GS1}<V_{GS2}$), and thus most of the LED driving current $I_{LED}$ may flow via the second transistor M2.

When Equation 3 below is satisfied as the rectified voltage $V_{REC}$ increases, the third transistor M3 may be turned on, and the LED driving current $I_{LED}$ may flow through the third transistor M3.

$$V_{N13} > V_{D41} + V_{D42} + V_{D43} + V_{CTR3} - V_{TH} \quad \text{[Equation 3]}$$

In Equation 3, $V_{D43}$ indicates a forward voltage of the third LED D43. In this case, the first transistor M1 and the second transistor M2 may also be turned on. However, the gate-source voltages $V_{GS1}$ and $V_{GS2}$ of the first and second transistors M1 and M2 may be less than a gate-source voltage $V_{GS3}$ of the third transistor M3 ($V_{GS1}$<$V_{GS2}$<$V_{GS3}$), and thus most of the LED driving current $I_{LED}$ may flow via the third transistor M3.

When Equation 4 below is satisfied as the rectified voltage $V_{REC}$ increases, the fourth transistor M4 may be turned on, and the LED driving current $I_{LED}$ may flow through the fourth transistor M4.

$$V_{N13} > V_{D41} + V_{D42} + V_{D43} + V_{D44} + V_{CTR4} - V_{TH} \quad [\text{Equation 4}]$$

In Equation 4, $V_{D44}$ indicates a forward voltage of the fourth LED D44. In this case, the first through third transistors M1 through M3 may also be turned on. However, the gate-source voltages $V_{GS1}$, $V_{GS2}$, and $V_{GS3}$ of the first through third transistors M1 through M3 may be less than a gate-source voltage $V_{GSR}$ of the fourth transistor M4 ($V_{GS1}$<$V_{GS2}$<$V_{GS3}$<$V_{GS4}$), and thus most of the LED driving current $I_{LED}$ may flow via the fourth transistor M4.

Figure 7B:
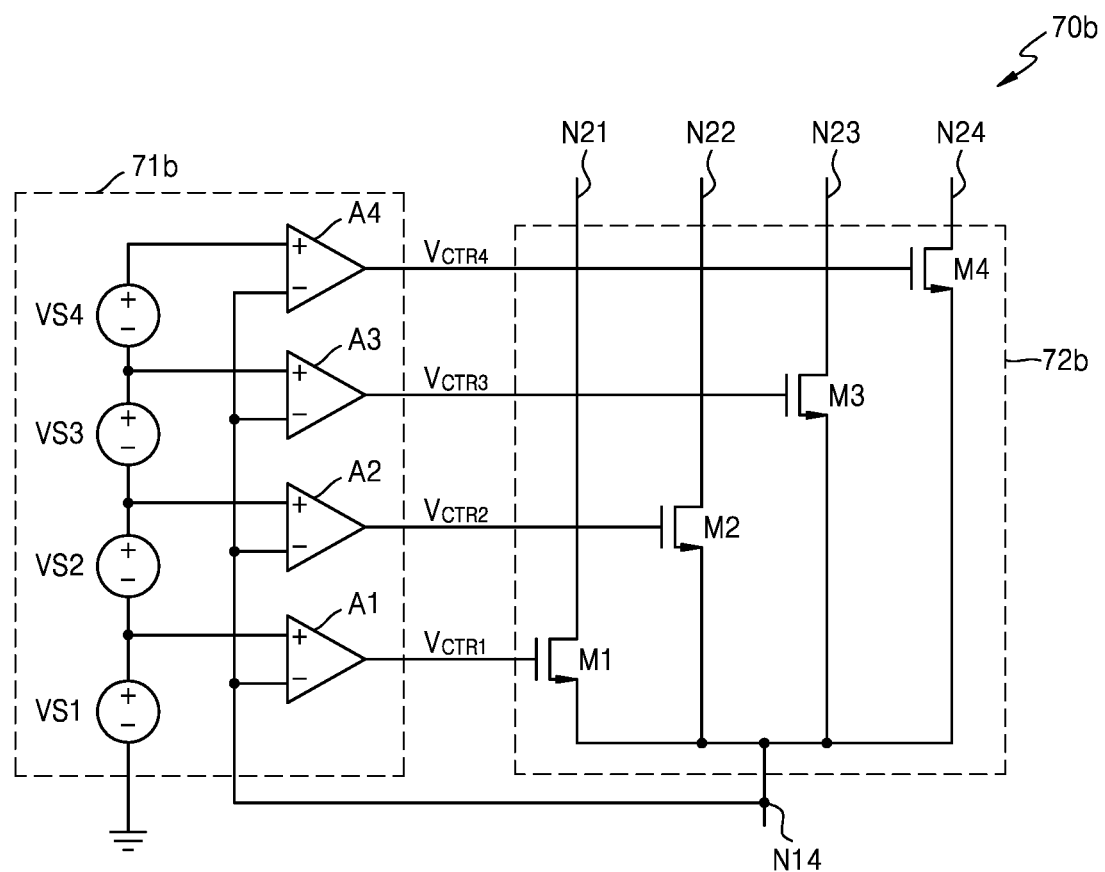
FIG. 7B is another example of a circuit diagram of a switch circuit according to one or more embodiments.

Referring to FIG. 7B, a switch circuit 70b may include a controller 71b and a plurality of switches 72b. The plurality of switches 72b may include first through fourth transistors M1 through M4 commonly connected to the first node N14 and respectively connected to the four second nodes N21 through N24.

Similar to the controller 71a of FIG. 7A, the controller 71b may include the first through fourth voltage sources VS1 through VS4 and may further include first through fourth amplifiers µl through A4. The first through fourth amplifiers µl through A4 may be operational amplifiers, and may include non-inverting inputs respectively connected to the first through fourth voltage source VS1 through VS4, respectively, and may include inverting inputs connected to the first node N14, respectively. Thus, compared with the controller 71a of FIG. 7A, the controller 71b of FIG. 7B may sensitively control the first through fourth transistors M1 through M4, and the first through fourth transistors M1 through M4 may be securely turned on or turned off.

Figure 7C:
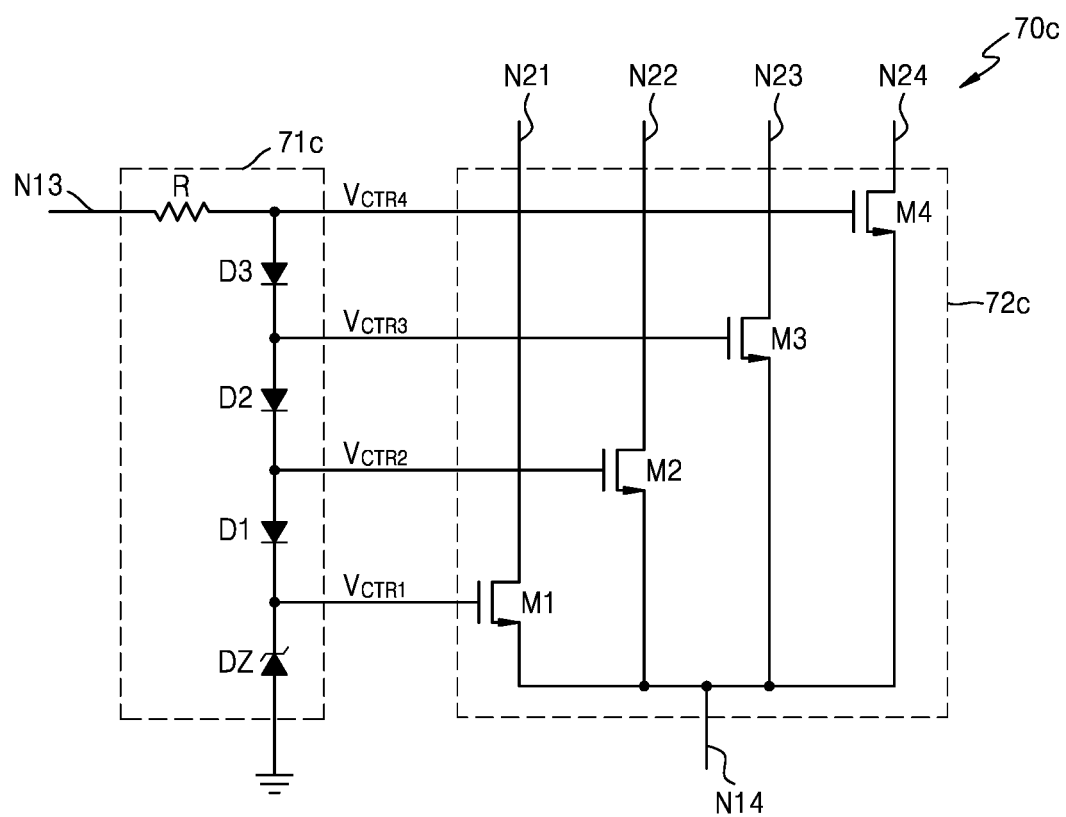
FIG. 7C is another example of a circuit diagram of a switch circuit according to one or more embodiments.

Referring to FIG. 7C, a switch circuit 70c may include a controller 71c and a plurality of switches 72c. The plurality of switches 72c may include first through fourth transistors M1 through M4 commonly connected to the first node N14 and respectively connected to the four second nodes N21 through N24.

The controller 71c may include a resistor R, first through third diodes D1 through D3, and a Zener diode DZ. As shown in FIG. 7C, the resistor R may be connected to the first node N13, and the first through third diodes D1 through D3 may be serially connected to one another between the resistor R and the Zener diode DZ. According to some embodiments, despite the illustration of FIG. 7C, each of the first through third diodes D1 through D3 may include two or more diodes connected to each other in series and/or in parallel, and the Zener diode DZ may include two or more Zener diodes connected to each other in series and/or in parallel. The number of diodes, the number of Zener diodes, the layout of the diodes, and the layout of the Zener diodes may be determined based on required first through fourth control voltages $V_{CTR1}$ through $V_{CTR4}$.

The voltage of the first node N13 may increase with an increase in the rectified voltage $V_{REC}$, and thus sequentially-increasing first through fourth control voltages $V_{CTR1}$ through $V_{CTR4}$ may be generated. A current for driving the Zener diode DZ and the first through third diodes D1 through D3 may be adjusted by the resistor R. According to some embodiments, differently from FIG. 7C, the resistor R may be connected to a node that provides a higher voltage than the first node N13, like the first node N12 of FIG. 4 or an internal node of the third LED string S3 of FIG. 4.

Figure 7D:
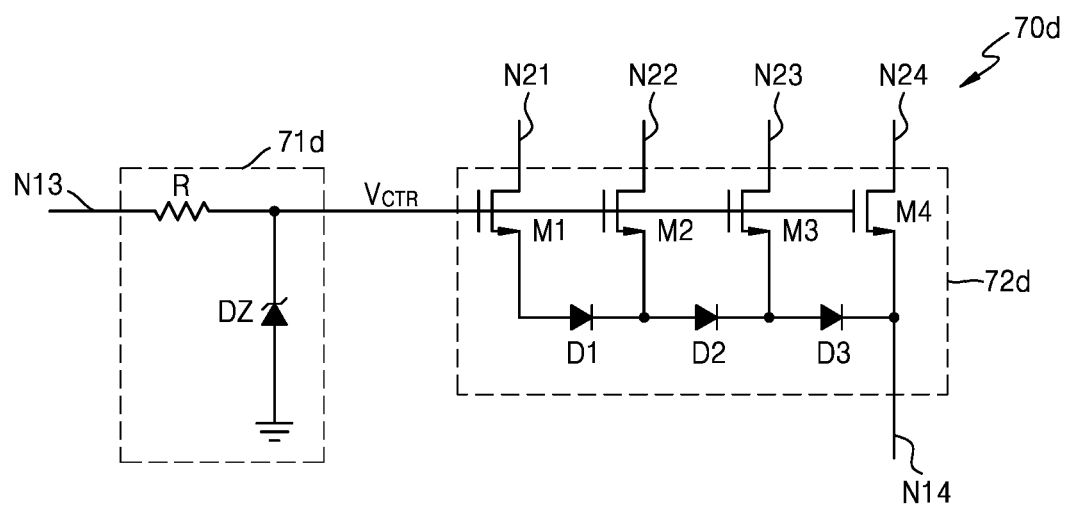
FIG. 7D is yet another example of a circuit diagram of a switch circuit according to one or more embodiments.

Referring to FIG. 7D, a switch circuit 70d may include a controller 71d and a plurality of switches 72d. The plurality of switches 72d may include first through fourth transistors M1 through M4 and first through third diodes D1 through D3. As shown in FIG. 7D, the first through fourth transistors M1 through M4 may be respectively connected to the four second nodes N21 through N24, and the first through third diodes D1 through D3 may be respectively connected to the first through third transistors M1 through M3. For example, the third diode D3 may have an anode connected to a source of the third transistor M3 and a cathode connected to a source of the fourth transistor M4.

As described above with reference to FIG. 6, the plurality of switches 72d may include cascaded first through fourth switches. For example, the first transistor M1 and the first diode D1 may correspond to the first switch, the second transistor M2 and the second diode D2 may correspond to the second switch, the third transistor M3 and the third diode D3 may correspond to the third switch, and the fourth transistor M4 and the fourth diode D4 may correspond to the fourth switch. Accordingly, as shown in FIG. 7D, the cascaded first through fourth switches may be controlled by a single control signal, namely, a control voltage $V_{CTR}$.

The controller 71d may include a resistor R and a Zener diode DZ. As shown in FIG. 7D, the resistor R may be connected to the first node N13, and the control voltage $V_{CTR}$ may correspond to a voltage of a node to which the resistor R and the Zener diode DZ are connected. Accordingly, the control voltage $V_{CTR}$ may correspond to a backward voltage of the Zener diode DZ, and may have a constant magnitude. According to some embodiments, differently from FIG. 7D, for a control voltage $V_{CTR}$ of an appropriate magnitude, the Zener diode DZ may include two or more Zener diodes connected to each other in series and/or in parallel.

The first through fourth transistors M1 through M4 may commonly receive the constant control voltage $V_{CTR}$ as a gate voltage, and may respectively have gate-source voltages that sequentially increase by the first through third diodes D1 through D3. Thus, as described above with reference to FIG. 7A, when the rectified voltage $V_{REC}$ gradually increases, the first through fourth transistors M1 through M4 may be sequentially mutually exclusively turned on, and then, when the rectified voltage $V_{REC}$ gradually decreases, the fourth through first transistors M4 through M1 may be sequentially mutually exclusively turned on.

Figure 7E:
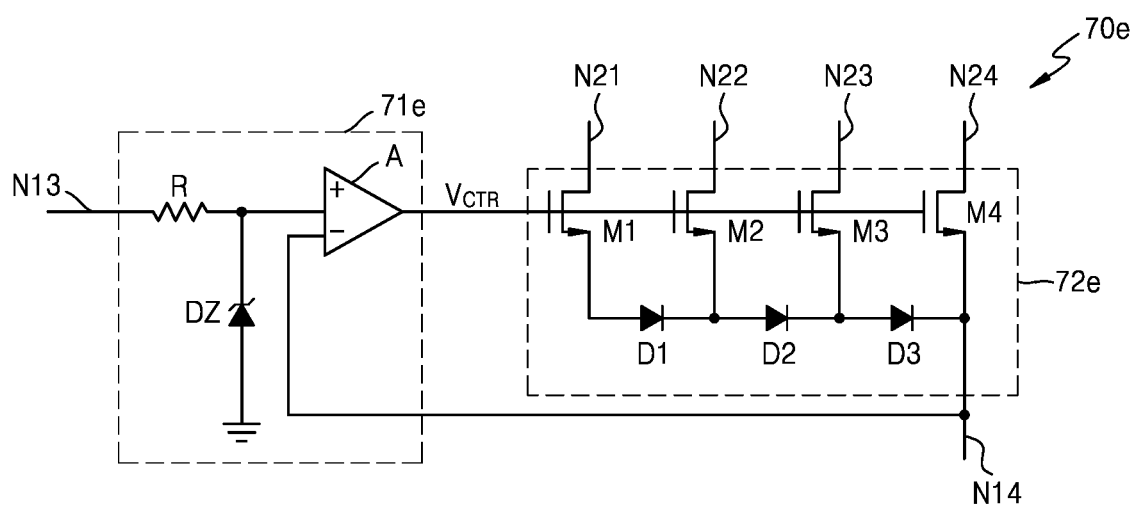
FIG. 7E is still yet another example of a circuit diagram of a switch circuit according to one or more embodiments.

Referring to FIG. 7E, a switch circuit 70e may include a controller 71e and a plurality of switches 72e. The plurality of switches 72e may include first through fourth transistors M1 through M4 and first through third diodes D1 through D3, similar to the plurality of switches 72d of FIG. 7D.

The controller 71e may include a resistor R and a Zener diode DZ, similar to the controller 71d of FIG. 7D, and may further include an amplifier A. The amplifier A may be an operational amplifier and may include a non-inverting input connected to the resistor R and the Zener diode DZ and an inverting input connected to the first node N14. Herein, a voltage of a node to which the resistor R and the Zener diode DZ are connected, namely, the non-inverting input of the amplifier A, may be referred to as a reference voltage. Compared with the controller 71d of FIG. 7D, the controller 71e of FIG. 7E may more sensitively control the first through fourth transistors M1 through M4, and the first through fourth transistors M1 through M4 may be more securely turned on or turned off.

Figure 8:
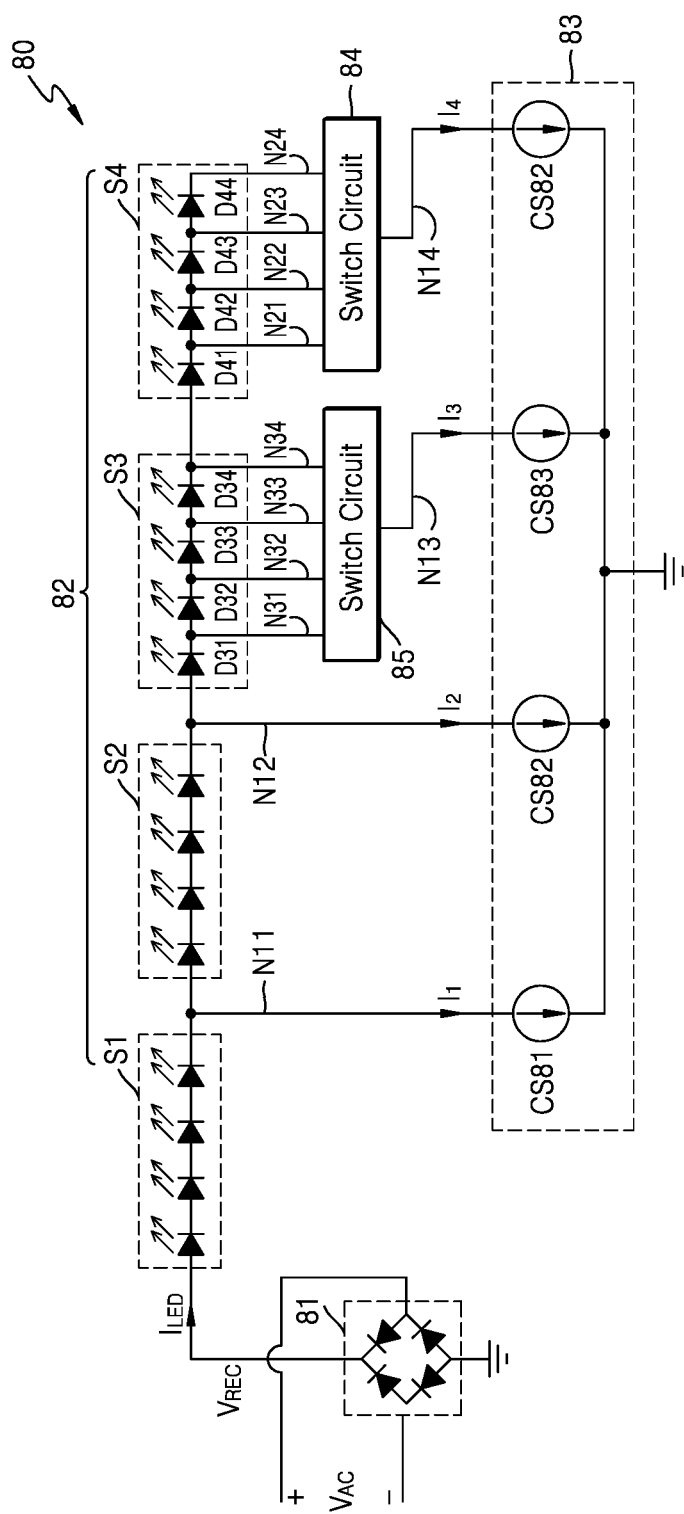
FIG. 8 is a block diagram of a lighting apparatus according to one or more embodiments.

FIG. 8 is a block diagram of a lighting apparatus 80 according to one or more embodiments. In detail, the block diagram of FIG. 8 shows the lighting apparatus 80 including a plurality of switch circuits. A description of FIG. 8 that is the same as given above with reference to FIG. 4 will be omitted.

Referring to FIG. 8, similar to the lighting apparatus 40 of FIG. 4, the lighting apparatus 80 may include a rectifier 81, an LED array 82, an LED driver 83, and a first switch circuit 84, and may further include a second switch circuit 85. The LED driver 83 may drain the LED driving current $I_{LED}$ from the LED array 82 the four first nodes N11 through N14. The first switch circuit 84 may be connected to the first node N14 (i.e., a first common node) from among the four first nodes N11 through N14, and may be connected to the LED array 82 via the four second nodes N21 through N24. As described above with reference to the drawings, the first switch circuit 84 may increase power efficiency by reducing power loss, and may maintain or increase power efficiency even when the magnitude of the AC voltage $V_{AC}$ fluctuates.

The lighting apparatus 80 may further include the second switch circuit 85 to further reduce power loss. The second switch circuit 85 may be connected to the first node N13 (i.e., a second common node) from among the four first nodes N11 through N14, and may be connected to the LED array 82 via four third nodes N31 through N34. The second switch circuit 85 may have the same structure as the first switch circuit 84, and thus the LED driving current $I_{LED}$ drained via the first node N13 may flow via one of the four third nodes N31 through N34. According to some embodiments, the lighting apparatus 80 may further include at least one additional switch circuit connected between the LED driver 83 and the LED array 82, similar to the first switch circuit 84 and the second switch circuit 85. An illustration of an operation in which the second switch circuit 85 increases power efficiency will be described later with reference to FIG. 9.

Figure 9:
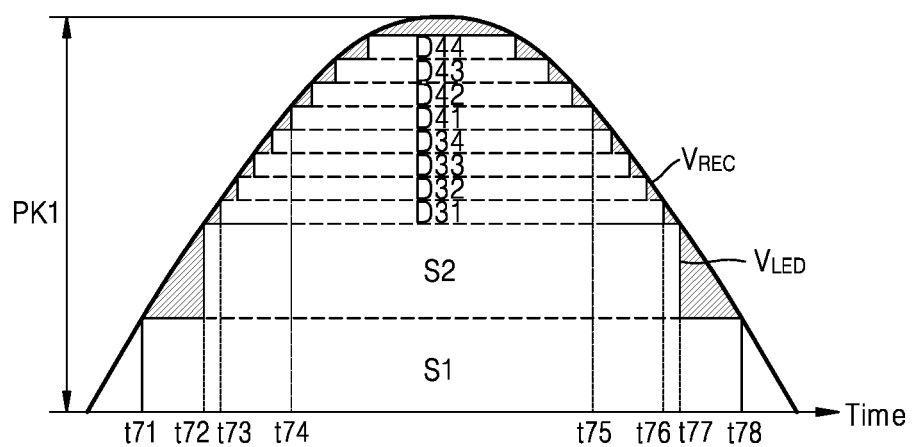
FIG. 9 is a timing diagram of an operation of a lighting apparatus according to one or more embodiments.

FIG. 9 is a timing diagram of an operation of a lighting apparatus according to one or more embodiments. In detail, the timing diagram of FIG. 9 illustrates an example of an operation of the lighting apparatus 80 of FIG. 8. FIG. 9 will now be described with reference to FIG. 8. In FIG. 9, a LED voltage VIED may correspond to a voltage across LEDs through which the LED driving current $I_{LED}$ passes.

Referring to FIG. 9, a rectified voltage $V_{REC}$ having a first peak PK1 may be provided to the LED array 82. In a period from a time point t71 to a time point t72 and a period from a time point t77 to a time point t78, only a first current source CS81 may be enabled and the LED driving current $I_{LED}$ may be equal to the first current $I_1$, and thus, as shown in FIG. 9, the first LED string S1 may emit light. In a period from the time point t72 to a time point t73 and a period from a time point t76 to the time point t77, only a second current source CS82 may be enabled and the LED driving current $I_{LED}$ may be equal to the second current $I_2$, and thus, as shown in FIG. 9, the first LED string S1 and the second LED string S2 may emit light.

In a period from the time point t73 to a time point t74, the second switch circuit 85 may allow the LED driving current $I_{LED}$ to sequentially pass through first through fourth LEDs D31 through D34 of the third LED string S3. In a period from a time point t75 to the time point t76, the second switch circuit 85 may allow the LED driving current $I_{LED}$ to be sequentially blocked from the fourth through first LEDs D34 through D31 of the third LED string S3. Likewise, in a period from the time point t74 to the time point t75, the first switch circuit 84 may allow the LED driving current $I_{LED}$ to sequentially pass through the first through fourth LEDs D41 through D44 of the fourth LED string S4, and then allow the LED driving current $I_{LED}$ to be sequentially blocked from the fourth through first LEDs D44 through D41 of the fourth LED string S4.

Power loss in a period from a time point when the second LED string S2 starts to emit light to a time point when the fourth LED string S4 (i.e., the first LED D41) starts to emit light (i.e., a period from the time point t72 to the time point t74 and a period from the time point t75 to the time point t77) in FIG. 9 may be reduced, compared with power loss in a period from a time point when the second LED string S2 starts to emit light to a time point when the fourth LED string S4 (i.e., the first LED D41) starts to emit light (i.e., the period from the time point t32 to the time point t33 and the period from the time point t42 to the time point t43) in FIG. 5A. Thus, power efficiency may be increased by the second switch circuit 85.

According to an LED driving device and a lighting apparatus according to one or more embodiments, loss of power from an AC voltage that is used to drive an LED may be minimized, and thus a lighting apparatus with high efficiency may be obtained.

Moreover, according to an LED driving device and a lighting apparatus according to one or more embodiments, a maximum number of LEDs may be driven even when the peak of an AC voltage fluctuates, and thus high power efficiency may be maintained.

In addition, according to an LED driving device and a lighting apparatus according to one or more embodiments, a switch circuit providing additional power efficiency may be easily added or removed, and thus lighting apparatuses corresponding to various requirements may be easily produced.

Effects that may be obtained in one or more embodiments are not limited to the above-stated effects, and other effects not stated may be clearly derived and understood from the above description by one of ordinary skill in the art to which one or more embodiments pertain. In other words, unintended effects associated with the reduction of one or more embodiments of the present disclosure into practice may also be derived from one or more embodiments by one of ordinary skill in the art.

The present disclosure has been particularly shown and described with reference to exemplary embodiments thereof. The terminology used herein is for the purpose of describing exemplary embodiments only and is not intended to be limiting of the present disclosure. Therefore, it will be understood by those skilled in the art that various changes in form and details may be made therein without departing from the spirit and scope of the present disclosure as defined by the appended claims.

What is claimed is:

1. A light emitting diode (LED) driving device for driving an LED array including one or more LEDs, the LED driving device comprising:
   a rectifier configured to provide a rectified voltage obtained from an alternating current (AC) voltage to the LED array;
   an LED driver configured to sequentially drain an LED driving current from the LED array via a plurality of first nodes; and
   a first switch circuit connected to the LED array via a plurality of second nodes, wherein
the first switch circuit comprises:
  a plurality of first switches respectively connected to the plurality of second nodes; and
  a first controller configured to control the plurality of first switches to be turned on and turned off while the LED driver is draining the LED driving current via a first common node that is one of the plurality of first nodes, and
when each of the plurality of first switches is turned on, the each of the plurality of first switches allows the LED driving current to flow to the first common node from a second node, wherein the second node is one of the plurality of second nodes and is connected to the each of the plurality of first switches.

2. The LED driving device of claim 1, wherein the LED driver is configured to drain a maximum amplitude of the LED driving current via the first common node.

3. The LED driving device of claim 2, wherein, when a peak of the AC voltage is less than a reference value, at least one of the plurality of first switches is always turned off.

4. The LED driving device of claim 1, wherein
the plurality of first switches comprise:
  a first transistor connected to the first common node and one of the plurality of second nodes; and
  a second transistor connected to the first common node and another of the plurality of second nodes,
when the second transistor is turned on, the LED driving current passes through at least one LED between second nodes to which the first transistor and the second transistor are respectively connected, from among the one or more LEDs, and
the first controller is configured to provide a first control voltage to the first transistor and provide a second control voltage greater than the first control voltage to the second transistor.

5. The LED driving device of claim 4, wherein each of the first control voltage and the second control voltage is a direct current voltage.

6. The LED driving device of claim 5, wherein the first controller comprises:
  a first amplifier configured to generate the first control voltage, based on a first reference voltage; and
  a second amplifier configured to generate the second control voltage, based on a second reference voltage.

7. The LED driving device of claim 4, wherein
the first controller comprises:
  a resistor connected to the LED array; and
  at least one diode connected to the resistor in series, and
the first control voltage is a voltage dropped from the second control voltage by the at least one diode.

8. The LED driving device of claim 1, wherein
the LED driver is included in a semiconductor package, and
the first switch circuit is mounted on a printed circuit board (PCB) together with the semiconductor package.

9. The LED driving device of claim 1 further comprising a second switch circuit connected to the LED array via a plurality of third nodes,
wherein the second switch circuit comprises:
  a plurality of second switches commonly connected to a second common node which is one of the plurality of first nodes, and respectively connected to the plurality of third nodes; and
  a second controller configured to control the plurality of second switches to be sequentially turned on and sequentially turned off.

10. The LED driving device of claim 1, wherein
the first controller is configured to generate a control voltage, and
the plurality of first switches comprise:
  a diode having a cathode connected to the first common node;
  a first transistor comprising a gate receiving the control voltage and a source connected to an anode of the diode; and
  a second transistor comprising a gate receiving the control voltage and a source connected to the first common node.

11. The LED driving device of claim 10, wherein the first controller comprises an amplifier configured to generate the control voltage, based on a reference voltage and a voltage of the first common node.

* * * * *